(12) United States Patent
Keller

(10) Patent No.: US 10,906,778 B2
(45) Date of Patent: Feb. 2, 2021

(54) ELEVATOR RAIL CLAMPING SYSTEM

(71) Applicant: Brian K. Keller, Marengo, IL (US)

(72) Inventor: Brian K. Keller, Marengo, IL (US)

( * ) Notice: Subject to any disclaimer, the term of this patent is extended or adjusted under 35 U.S.C. 154(b) by 420 days.

(21) Appl. No.: 16/106,393

(22) Filed: Aug. 21, 2018

(65) Prior Publication Data

US 2019/0168996 A1 Jun. 6, 2019

Related U.S. Application Data

(60) Provisional application No. 62/548,198, filed on Aug. 21, 2017.

(51) Int. Cl.
*B66B 5/00* (2006.01)
*F16M 13/02* (2006.01)

(52) U.S. Cl.
CPC .......... *B66B 5/0075* (2013.01); *B66B 5/0087* (2013.01); *F16M 13/022* (2013.01)

(58) Field of Classification Search
CPC ..... B66B 5/0087; B66B 5/0075; B66B 7/024; B66B 19/002; F16M 13/022
See application file for complete search history.

(56) References Cited

U.S. PATENT DOCUMENTS

| | | | | |
|---|---|---|---|---|
| 4,637,496 A | * | 1/1987 | Atkey | B66B 7/022 187/408 |
| 5,131,505 A | * | 7/1992 | Isenmann | B66B 7/024 187/408 |
| 5,950,770 A | * | 9/1999 | Koeppe, Jr. | B66B 7/026 187/406 |
| 6,390,721 B1 | * | 5/2002 | Wilson, II | F16B 7/0493 403/312 |
| 10,487,511 B2 | * | 11/2019 | Lallier | E04D 15/00 |
| 2007/0170011 A1 | * | 7/2007 | Takashi | B66B 17/34 187/375 |
| 2012/0102685 A1 | * | 5/2012 | Keller | F16B 2/10 24/517 |
| 2019/0168996 A1 | * | 6/2019 | Keller | B66B 5/0075 |
| 2020/0062547 A1 | * | 2/2020 | Simonatto Marques | B66B 7/024 |

FOREIGN PATENT DOCUMENTS

JP 11011820 * 11/1999

* cited by examiner

*Primary Examiner* — Michael A Riegelman
(74) *Attorney, Agent, or Firm* — Bishop, Diehl & Lee, Ltd.

(57) ABSTRACT

An elevator rail clamping system for coupling to omega elevator rails is disclosed. Each omega elevator rail having a circular portion and a pair of wings extending therefrom. The system including a pair of hinged clamps with each clamp having a pair of jaws for receiving the circular portion of an omega elevator rail. The system further including an adjustable length load bearing beam mounted to each clamp.

15 Claims, 6 Drawing Sheets

US 10,906,778 B2

ELEVATOR RAIL CLAMPING SYSTEM

RELATED APPLICATION

This application claims priority of and incorporates by reference Provisional Application No. 62/548,198, entitled "Elevator Rail Clamping System" and filed on Aug. 21, 2017.

TECHNICAL FIELD OF THE INVENTION

The present application relates to a clamping system for use while repairing elevator cars or other equipment in an elevator shaft. In particular, the application relates to an omega elevator rail clamping system as well as methods and devices for creating such an omega elevator rail clamping system to safely work in an elevator shaft below an elevator car.

BACKGROUND AND OBJECTS OF THE INVENTION

Often to repair, move, install, work on, or otherwise handle elevator cars, systems, or any equipment in an elevator shaft, it is necessary to secure the heavy elevator car. In the past, for omega elevator rails, riggings using straps, hoses, and chains were common tools for such operations. However, these systems were unstandardized and unreliable. Accordingly, there is a need in the art for an improved clamping system for an omega elevator rail that securely fixes the position of the elevator car so repairs can be effectuated below the car or on the car. In addition, there is a need for a structure that can be selectively placed in an elevator shaft that provides a fixed joist or beam structure for attaching a hoist or other rigging for moving or holding equipment in an elevator shaft.

These and other problems are addressed by the present device and methods to provide a system with numerous advantages in operation and effectiveness.

BRIEF DESCRIPTION OF THE DRAWINGS

For the purpose of facilitating an understanding of the subject matter sought to be protected, there are illustrated in accompanying drawings embodiments thereof, from an inspection of which, when considered in connection with the following description, the subject matter sought to be protected, its construction and operation, and many of its advantages should be readily understood and appreciated.

DETAILED DESCRIPTION OF PREFERRED EMBODIMENTS

Figure 1:
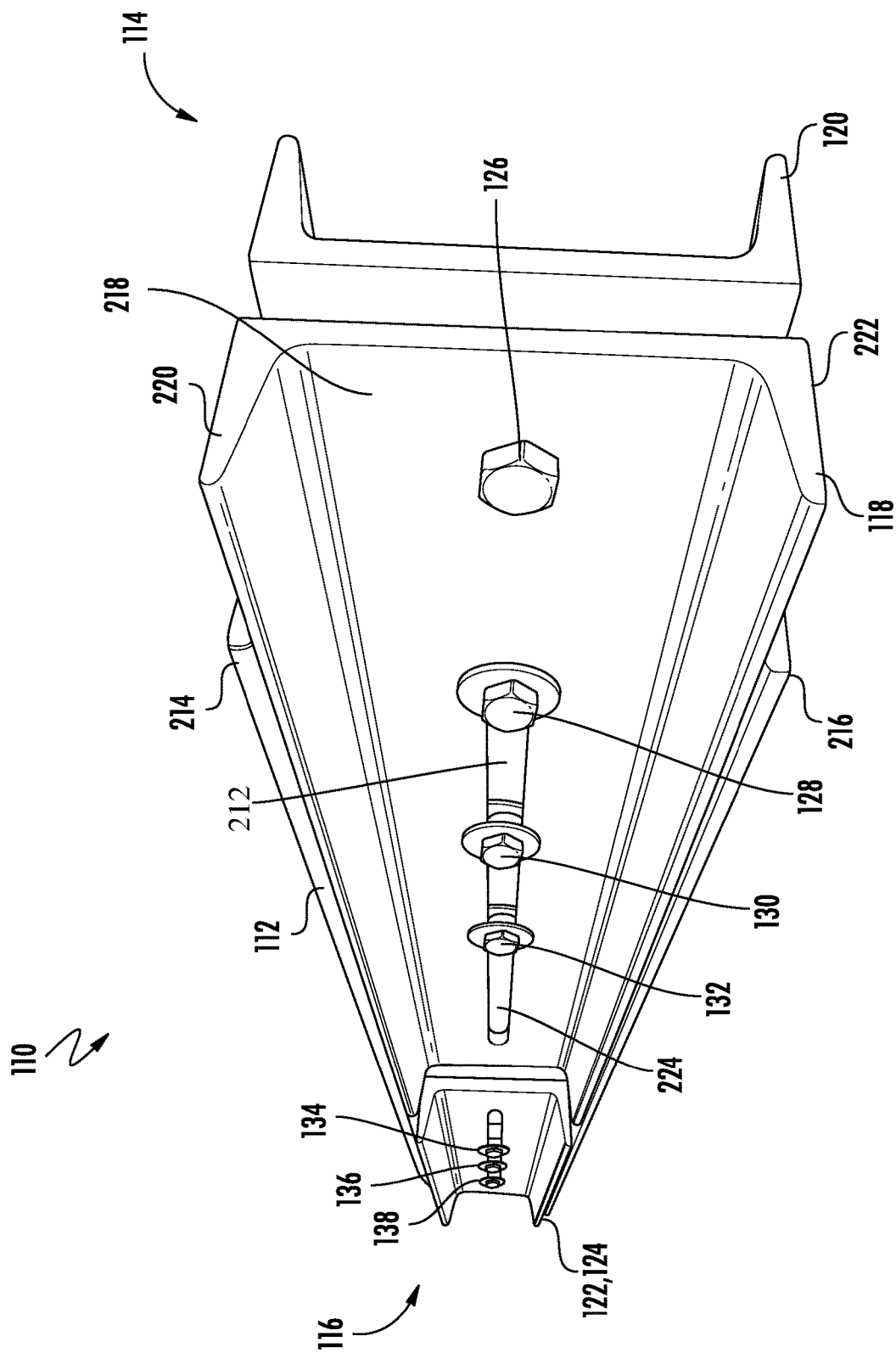
FIG. 1 is a perspective view of an extendable load bearing beam in accordance with the present invention.

While this invention is susceptible of embodiments in many different forms, there is shown in the drawings and will herein be described in detail a preferred embodiment of the invention with the understanding that the present disclosure is considered an exemplification of the principles of the invention and is not intended to limit the broad aspect of the invention to the embodiment(s) illustrated.

Specifically, referring to FIG. 1 there is illustrated an extendable length load bearing beam 110 comprising a center or base I-beam or girder 112 with extension members 114, 116 coupled to each of the distal ends of the center girder 112. As will be appreciated by those having ordinary skill in the art, the extendable load bearing beam 110 is substantially symmetrical about planes passing through both the y and x longitudinal axes of the extendable beam. In an embodiment, the girder 112 and extensions 114, 116 are constructed of a light weight material such as an extruded aluminum alloy.

In an embodiment, the center girder 112 can have an I or H section, or other desired section. Accordingly, the girder 112 has a web plate 212 located between and attached to a pair of flanges 214, 216. Moreover, a plurality of holes (not shown) are located in the web plate 212 with bolts 128-138 passing therethrough.

Accordingly, the bolts 128-132 provide multiple securing points to adjustably allow for the beam extensions 114, 116 to extend or retract, and thus providing for the beam 110 to appropriately fit (i.e., extend or retract) in a working area such as an elevator shaft. In an embodiment, each extensions 114, 116 consists of a pair of channel irons 118, 120, 122, 124 that are secured to one another proximate a distal end by a bolt. For instance, bolt 126 secures together channel irons 118 and 120. As shown in FIG. 1, between each pair of channel irons is a gap or space for receiving at least a portion of the center girder web 212. Moreover, each channel iron consists of a web 218 positioned between and attached to a pair of flanges 220, 222 such that each channel iron has a U section and the web and flanges of each channel iron adjoins a portion of the web 212 and flanges 214, 216 of the girder 112. The web of each channel iron has a partial longitudinal axial opening 224 for receiving the bolts 128-138 passing through the girder web 212.

The position of the channel irons 118, 120, 122, 124 are adjustably fixed by tightening bolts 128-138 to like nuts attached on their like ends. The bolts 128-138 can be tighten once the beam extensions 114, 116 have been extended or retracted to a desired length so the beam 110 appropriately fits in the working area such as an elevator shaft. In an embodiment, the channel irons 118, 120, 122, 124 are constructed of a light weight material such as an extruded aluminum alloy. As explained below, the beam 110 can be used to rest an elevator car, or a car component, on top of the beam 110 while work is being performed below the car or on the car. The embodiment securely, and safely, holds the elevator car in place. Alternatively, the beam 110 provides a fixed joist or structure that can be selective placed in an elevator shaft and provides for attaching a hoist or other rigging for moving or holding equipment in an elevator shaft.

Figure 2:
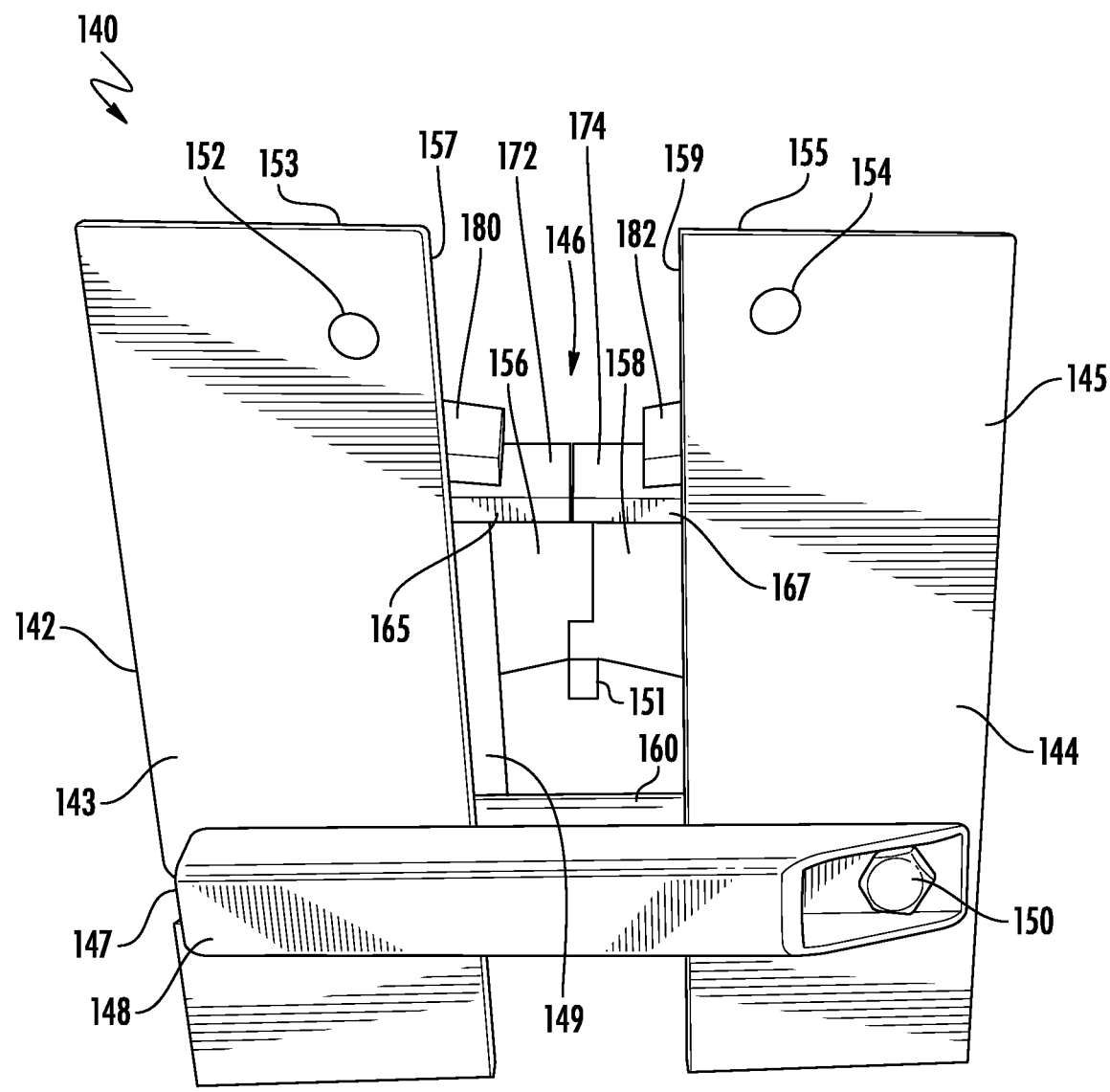
FIG. 2 is a perspective view of a clamp, in a closed position, in accordance with the present invention.
Figure 3:
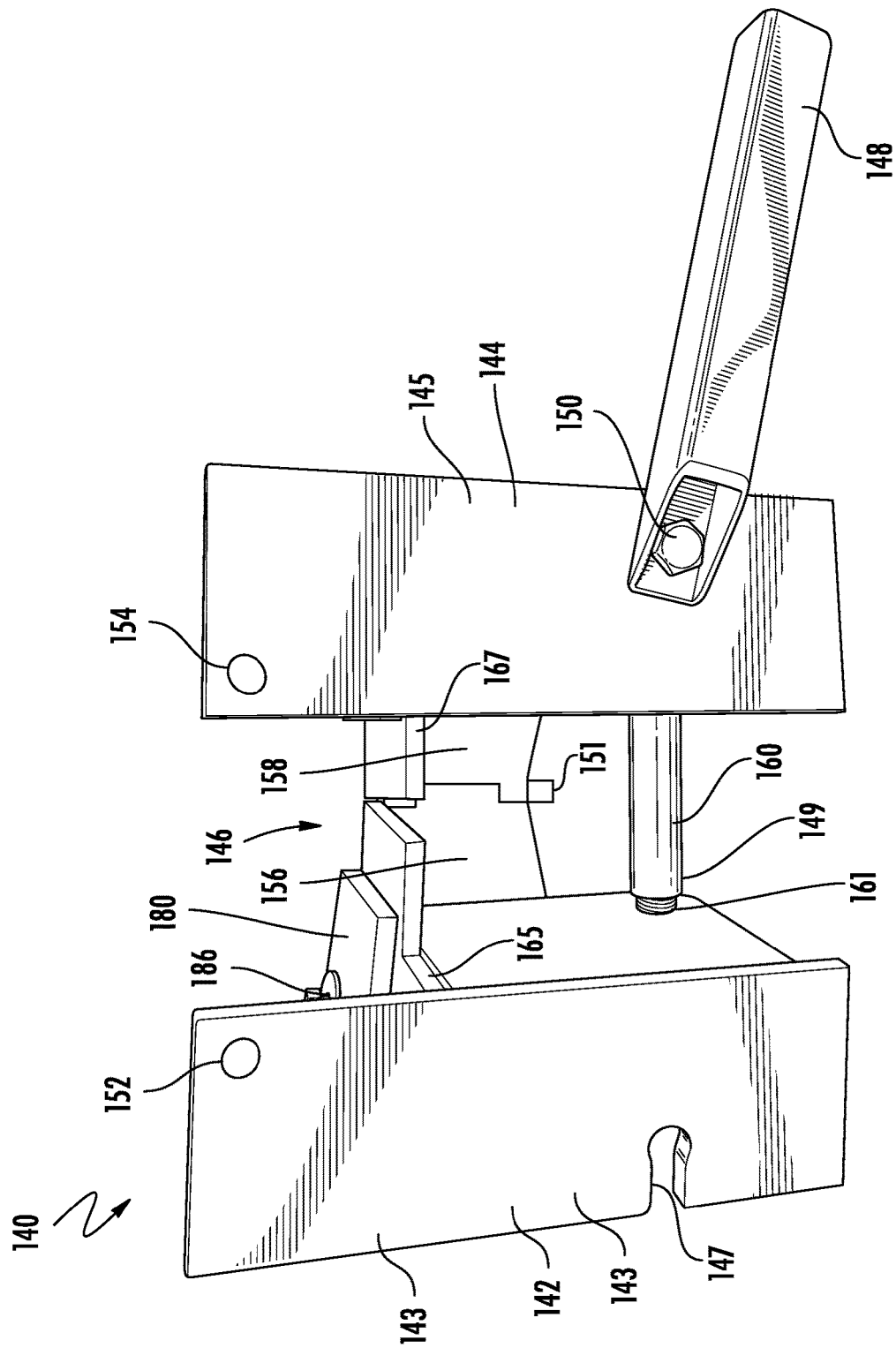
FIG. 3 is a perspective view of the clamp in FIG. 2 in an opened position.

Referring now to FIG. 2, there is illustrated a clamp 140 in accordance with an embodiment of the present invention in a closed and latched position. The clamp 140 comprising a pair of tee-irons or jaws 142, 144 connected by a hinge member 146 and a securing latch arm 148. When closed, the clamp, and in particular the jaws 142, 144, form a throat 149 for receiving at least a portion of an elevator guide rail as described further herein. Each jaw 142, 144, includes a nose plate 143,145 comprising a rectangular web of metal or metal alloy. Moreover, nose plate 143 includes a substantially bell arch shaped void or hollow 147 (FIG. 3).

The clamp hinge 146 is located opposite the latch 148 that is mounted on the tee-irons or jaws 142, 144, and in particular the nose plates 143, 145. The hinge 146 is conventional in construction and consists of a plurality of knuckles forming a barrel for receiving a pin or bolt (not shown) secured with a nut 151. In an embodiment the clamp 140 is constructed of a metal or metal alloy. The latch arm 148 is releasably connected to the tee-iron or jaw 142 by a conventional swing bolt (not shown) received within nose plate hollow 147 and coupled to a flange nut or thumb nut (FIG. 6) 188. Further, the latch arm 148 is pivotally connected to tee-iron or jaw 144 by a bolt 150 received within nose plate 145 and attached by a coupling nut (not shown).

Figure 4:
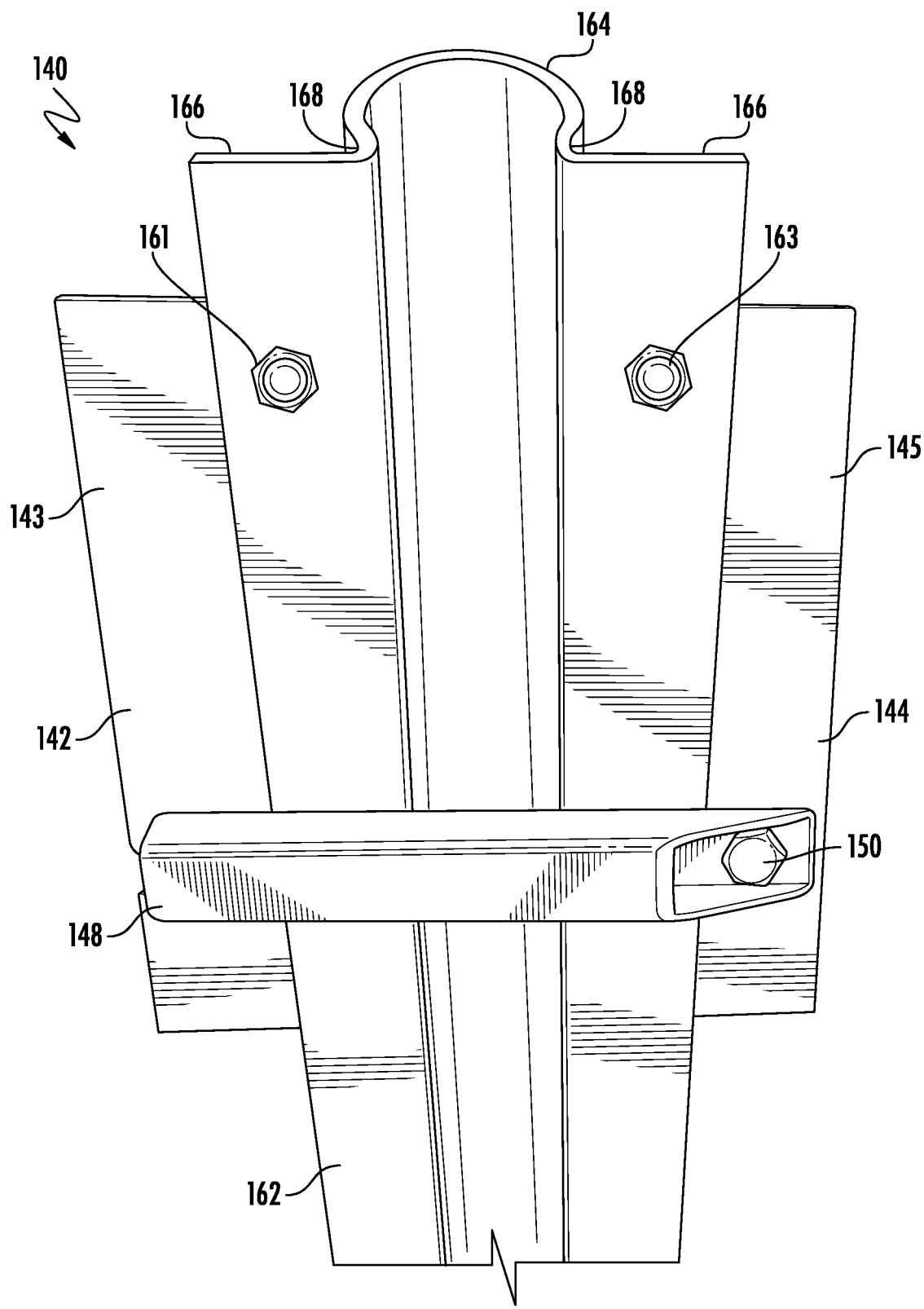
FIG. 4 is the clamp of FIGS. 2 and 3 attached to a conventional elevator omega rail.

Fastening apertures or holes 152, 154 are located on the nose plates 143, 145 of the jaws or tee-irons 142, 144 for further securing the clamp 140 to an elevator omega rail as well known in the field of art. In an embodiment, the holes 152, 154 are located proximate the top edge 153, 155 of the nose plates 143, 145 and askew from the longitudinal centerline of each plate proximate the inner edge 157, 159 of each plate. The fastening hole 152 on nose plate 143 of tee-iron 142 facilitates securing the clamp 140 to an omega rail by a hex nut and bolt 157 (FIG. 4), and the fastening hole 154 on nose plate 145 of tee-iron 144 facilitates securing the clamp 140 to the omega rail by hex nut and bolt 159 (FIG. 4).

As indicated previously, the hinge 146 connects the jaws or tee-irons 142, 144 via frame or hinge leafs members 156, 158, respectively. The hinge leafs members 156, 158 are connected by knuckles to allow the hinge 146 and thereby the jaws 142, 144 of the clamp to open, and close, and thus receiving at least a portion of an omega rail within the throat 149 of the clamp.

Figure 6:
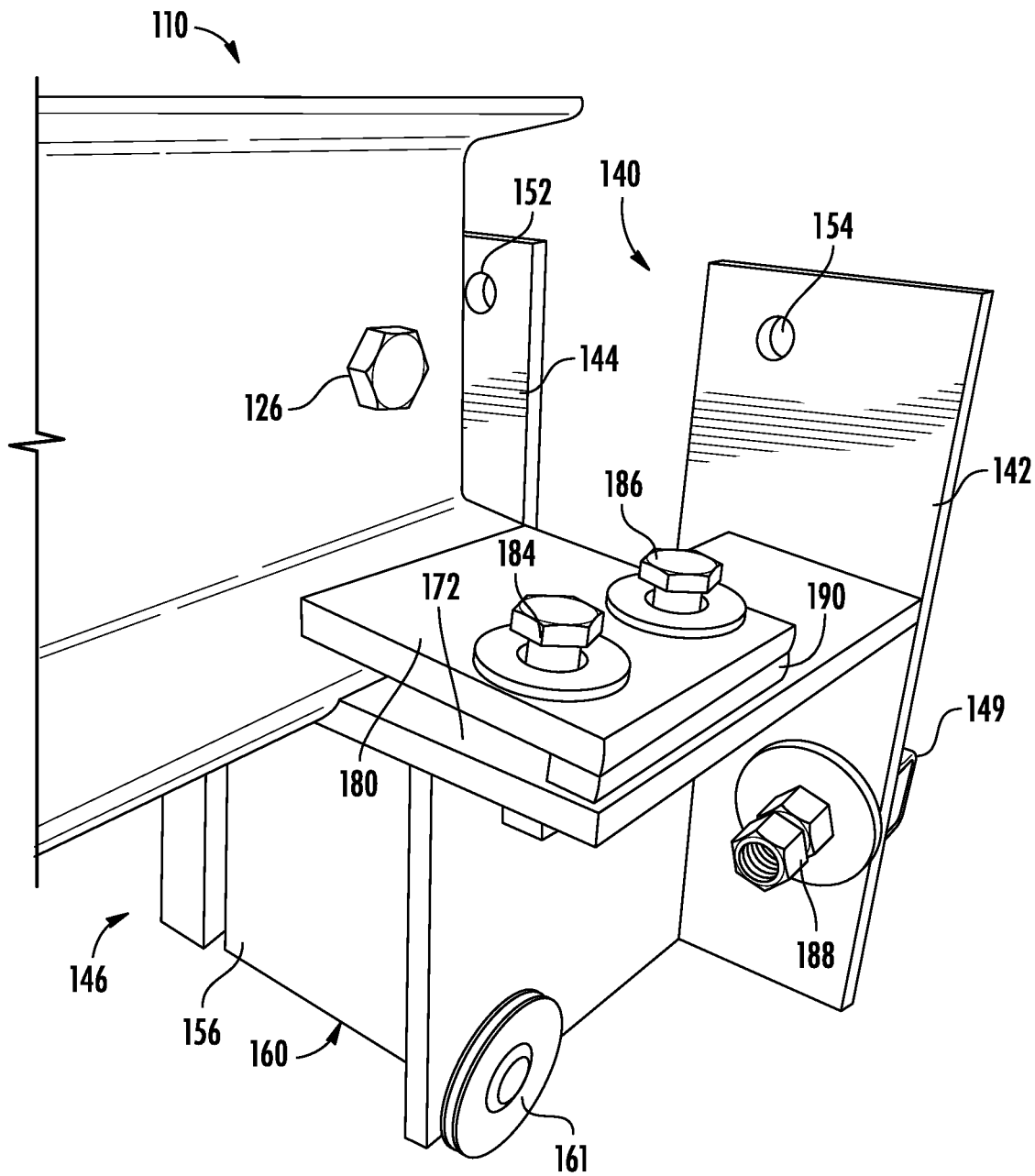

In an embodiment, the jaws of the clamp 140 are closed to firmly secure it to an omega rail by placing the latch arm 148 in the closed position as shown in FIG. 2 and tightening nut 188 (FIG. 6). In the closed position, the clamp 140 encloses at least a portion of the omega rail and the latch arm 148 further encloses the omega rail to prevent moving, or sliding, of the clamp 140 while work is being performed below an elevator car or on the elevator car. In an embodiment, the clamp 140 can include a frame roller 160, comprising a metal or metal alloy tube with a bolt 161 passing therethrough that loosely connects tee-irons 142, 144 and allows for the clamp 140 to easily travel while positioning it to an appropriate location on the omega rail. Additionally, the frame roller 160 can be used to hang chains or other working tools for convenience. While the clamp 140 is in the closed position, the hinge leaf members 156, 158 are preferably at about 90 degrees relative to each other.

In an embodiment, each tee-iron 142, 144 is configured to provide a planar beam resting surface or seat 172, 174 that is provided by an L-shaped member 165, 167 extending perpendicularly from each jaw nose plate. Moreover, associated with each seat 172, 174 is a beam griping ear or plate 180, 182 that is attached to its respective tee-iron by a pair of tightening bolts (FIG. 6) and spaced above its respective seat by a spacer 190 (FIG. 6).

Referring now to FIG. 3, there is illustrated the clamp 140 wherein the claim is unlatched and the jaws are open. As indicated previously, the clamp 140 is placed in the opened position to adjust, attach, detach, or move, the clamp 140 along the elevator omega rail.

In an embodiment, the latch arm 148 is placed in the open position by unfastening one end of the latch from nose plate 143. In particular, the one end of the latch is unfastened by loosening or removing the circular threaded base rod coupling nut 188 (FIG. 6) from the pivoting screw bolt (not shown) attached to the arm 148, and then swinging the bolt out of nose plate hollow 147. The securing latch 148 can move or pivot 360 degrees along the tee-iron 144 and in particular nose plate 145. In the open position the hinge 146 can widen greater than 90 degrees for allowing the clamp 140 to be detached, or attached, to an elevator omega rail 162 (FIG. 4).

In an embodiment, while the clamp 140 is in the open position a frame roller bolt 161 remains loosely connected to the tee-irons 142, 144 for limiting how widely the jaws of the clamp can open (i.e., travel), and thus preventing the jaws from unnecessarily opening too wide and making the handling of the clamp difficult. Accordingly, the bolt 161 that passes through roller 160 and is loosely connected to the tee-irons can have a length allowing for the opening of the clamp jaws, but only by a desired distance.

Referring now to FIG. 4, there is illustrated the clamp 140 of FIGS. 2 and 3 attached to the elevator omega rail 162 wherein, as indicted previously, the apertures in the clamp nose plates are positioned closer to the longitudinal axis of the clamp than the distal ends of the latch arm 148. The clamp 140 is in the closed position and is securely attached to the omega rail 162. In particular, the circular portion 164 of the omega rail is received within the throat of the clamp 140 while the wings 166 of the omega rail adjoin respective clamp nose plates 143,145. As such, the inner edges 157, 159 (FIG. 2) of the nose plates 143, 145 are positioned proximate to the respective junctions 168 between the circular portion 164 of the omega rail and the omega rail wings 166.

The latch arm 148 is positioned over a portion of the omega rail 162, and in particular the wings 166 of the rail. In particular, the latch arm 148 is swung over and overlays the omega rail wings 166 and next the pivoting screw bolt is moved within nose plate slot 147. The circular threaded base rod coupling nut 188 (FIG. 6) is then tightened. Accordingly, the latch arm 146 is in the locked position and encloses the omega rail 162. Moreover, holes can be drilled through the wings of the omega rail at the nose plate fastening holes 152, 154, and bolts 161, 163 can be positioned through the drilled holes in the omega rail wings and then clamp nose plates 143, 145 to secure the clamp 140 to the omega rail for preventing moving or sliding of the clamp 140 while work is being performed below the car or on the car.

Figure 5:
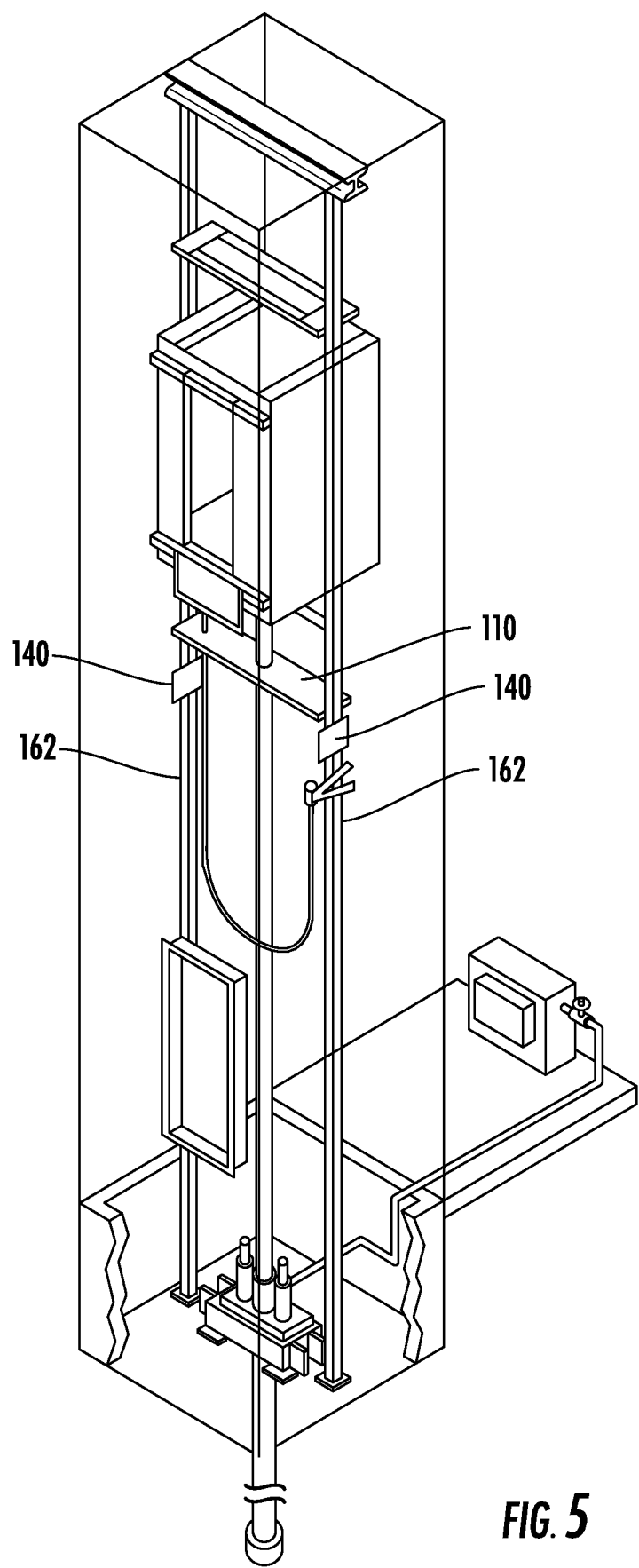
FIG. 5 is an outline of an elevator clamping system in accordance with the present invention wherein a pair of clamps as shown in FIGS. 2 and 3 are attached to omega elevator guide rails and the extendable load bearing beam of FIG. 1 extends, and is attached to, the clamps and bears the weight of the elevator car; and, FIG. 6 is a perspective view of one end of the extendable beam of FIG. 1 attached to the clamp of FIGS. 2 and 3.

Referring now to FIG. 5, there is illustrated the elevator clamping system mounted within an elevator shaft. In particular, a pair of clamps 140 as depicted in FIG. 4 are respectfully secured to the pair elevator guide rails 162 in the elevator shaft. As indicated previously, once the latch 148 of each claim 140 is safely secured to the respective omega rail 140, holes are then drilled in the omega rail corresponding to the location of the fastening holes 152, 154. The clamps 140 are then further secured to the omega rail by bolts and hex nuts extending through fastening holes 152, 154 and the recently drilled holes of the omega rail.

As illustrated in FIG. 6, once the clamp 140 is secured to the omega rail, then the load bearing beam, and in particular a beam extension end, rests on the clamp beam seat 172, 174 with a channel flange to each beam extension channel iron sliding under the securing ears 180, 182 (FIG. 2). The respective channel iron is then fastened to ear 180 by bolts and hex nuts 184, 186 associated with each securing ear. The process of installing the extendable length beam 10 is then done to the opposite corresponding side with the second clamp wherein the length of the beam can be adjusted by loosening and tightening the bolts 128-138 (FIG. 1).

Accordingly, referring back to FIG. 5, once the load bearing beam system is mounted within the elevator shaft, the elevator car can rest safely atop the load bearing beam so work can be safely performed below the car or on the car.

The matter set forth in the foregoing description and accompanying drawings is offered by way of illustration and only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. An elevator rail clamping system for attached to omega elevator rails having a circular portion and a pair of wings extending therefrom, the system comprising:
   a pair of hinged clamps, each clamp having a pair of jaws for receiving the circular portion of one of the omega elevator rails and a nose plate for bolting to the wings of the rail; and,
   an extendable length load bearing beam mounted to each of the clamps.

2. The elevator rail clamping system of claim 1 wherein each clamp has a throat for receiving said omega elevator rail circular portion.

3. The elevator rail clamping system of claim 1 wherein each clamp has a beam seat extending perpendicularly from the nose plate and a beam securing ear bolted thereto.

4. The elevator clamping system of claim 1 wherein each clamp includes a roller.

5. The elevator rail clamping system of claim 1 wherein each nose plate has at least one aperture extending therethrough.

6. The elevator rail clamping system of claim 1 wherein the load bearing beam includes an I-beam and a pair of extendable ends attached to the I-beam.

7. The elevator rail clamping system of claim 1 wherein each clamp includes a bolt for limiting travel between the jaws.

8. A clamp for attaching to an omega elevator rail having a circular portion and a pair of wings extending therefrom, the clamp comprising:
   a pair of hinged jaws for receiving the circular portion of the omega elevator rail;
   a nose plate attached to the distal end of each jaw and comprising a web of metal or metal alloy, each nose plate having an aperture extending therethrough; and,
   a bolt extending through each aperture and into the wings of the elevator rail.

9. The clamp of claim 8 wherein the jaws form a throat for receiving said omega elevator rail circular portion.

10. The clamp of claim 9 further comprising a beam seat extending perpendicular from each of the nose plates.

11. The clamp of claim 10 further comprising a securing ear attached to each beam seat.

12. The clamp of claim 8 further comprising a latch arm attached to one nose plate.

13. The clamp of claim 8 further comprising a latch arm attached to both nose plates.

14. The clamp of claim 8 further comprising a roller attached to both jaws.

15. The clamp of claim 8 further comprising a bolt attached to both jaws for limiting travel between the jaws.

* * * * *